United States Patent
Yoo et al.

(12)
(10) Patent No.: US 6,309,591 B1
(45) Date of Patent: *Oct. 30, 2001

(54) APPARATUS FOR BONDING A PARTICLE MATERIAL TO NEAR THEORETICAL DENSITY

(75) Inventors: Sang H. Yoo, Fairfax; Krupashankara M. Sethuram, Falls Church; Tirumalai S. Sudarshan, Vienna, all of VA (US)

(73) Assignee: Materials Modification, Inc., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/412,518

(22) Filed: Oct. 5, 1999

Related U.S. Application Data

(63) Continuation of application No. 09/274,878, filed on Mar. 23, 1999, now Pat. No. 5,989,487.

(51) Int. Cl.[7] .................................. B22F 3/14; B22F 7/04
(52) U.S. Cl. .............................................. 266/249; 425/78
(58) Field of Search ................................. 425/78; 266/249

(56) References Cited

U.S. PATENT DOCUMENTS 3,630,727   12/1971   Rossmann .
4,435,359   3/1984   Eiselstein et al. .

*Primary Examiner*—Daniel J. Jenkins
(74) *Attorney, Agent, or Firm*—Dinesh Agarwal, P.C.

(57) ABSTRACT

An apparatus for bonding a particle material to near theoretical density, includes a chamber, a punch and die assembly for supporting a particle material, plungers for applying shear and/or axial pressures, and a power supply for applying a current. In the first stage, a pulsed current of about 1 to 20,000 amps., is applied to the particle material for a predetermined time period, and substantially simultaneously therewith, a shear force of about 5–50 MPa is applied. In the second stage, an axial pressure of about less than 1 to 2,000 MPa is applied to the particle material for a predetermined time period, and substantially simultaneously therewith, a steady current of about 1 to 20,000 amps. is applied. The apparatus may be used to bond metallic, ceramic, intermetallic and composite materials to near-net shape, directly from precursors or elemental particle material without the need for synthesizing the material. The method may also be applied to perform combustion synthesis of a reactive material, followed by consolidation or joining to near-net shaped articles or parts. The apparatus may further be used to repair a damaged or worn substrate or part, coat a particle onto a substrate, and grow single crystals of a particle material.

19 Claims, 8 Drawing Sheets

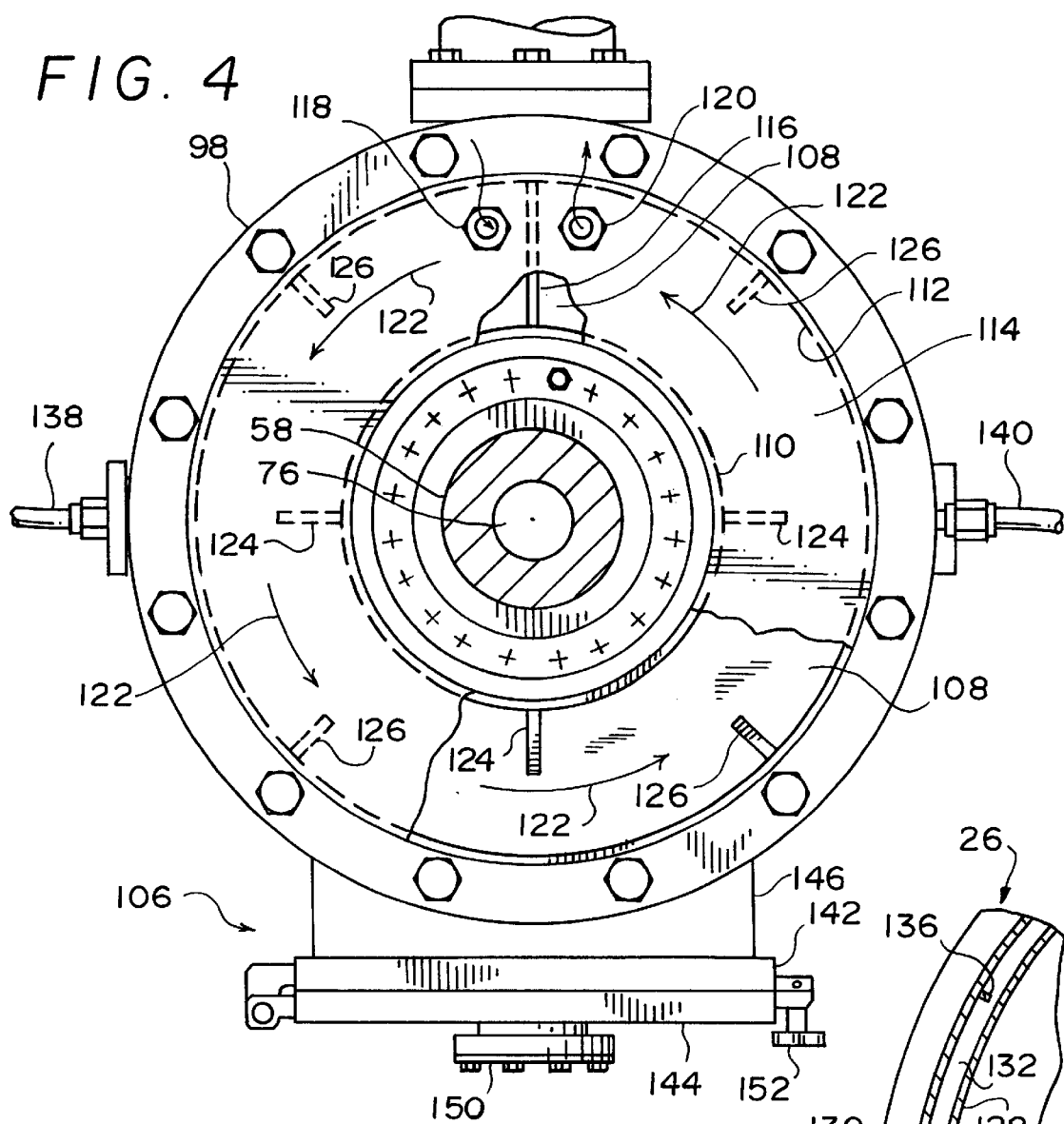
FIG. 4
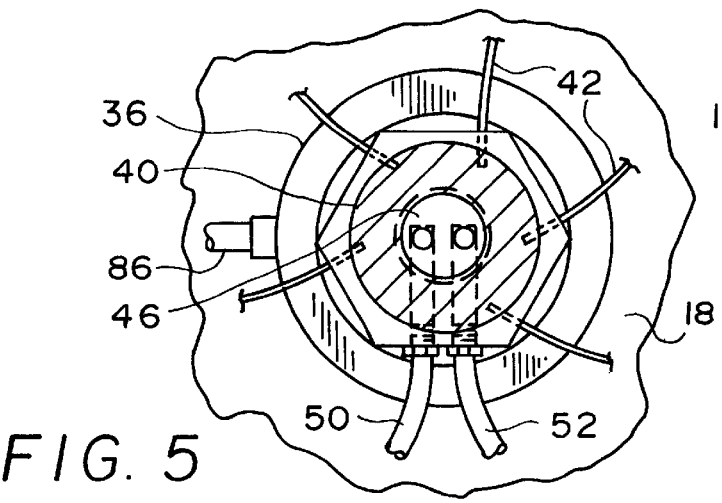
FIG. 5
FIG. 6

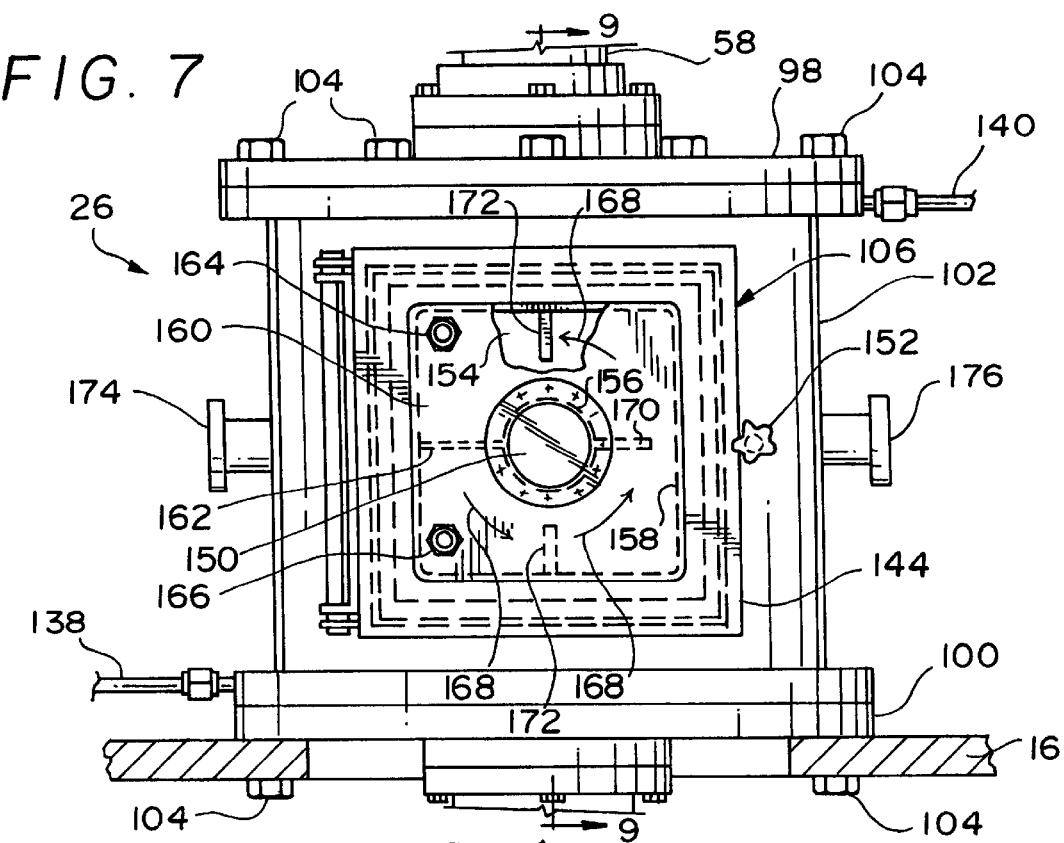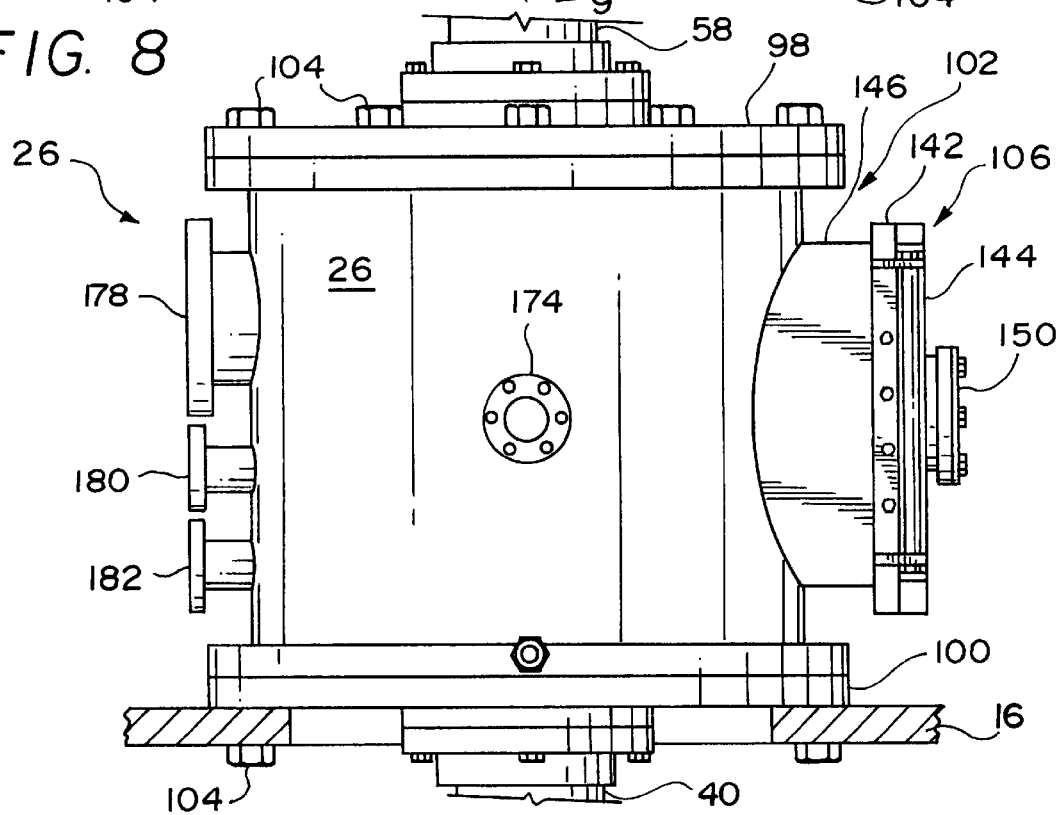

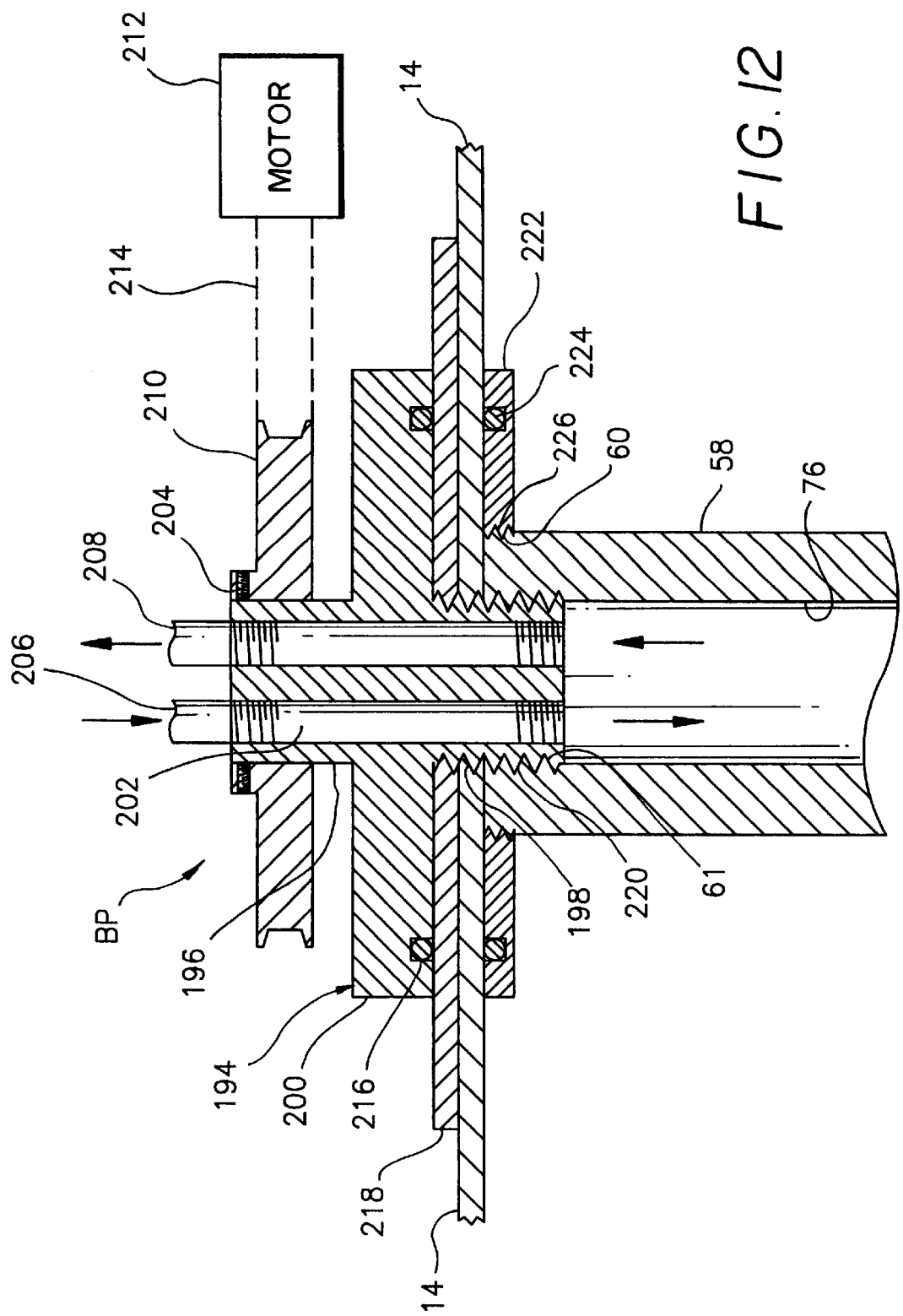

APPARATUS FOR BONDING A PARTICLE MATERIAL TO NEAR THEORETICAL DENSITY

CROSS-REFERENCE TO RELATED APPLICATIONS

This is a Continuation of application Ser. No. 09/274,878 filed Mar. 23, 1999 now U.S. Pat. No. 5,989,487.

The present application is related to co-pending U.S. application Ser. No. 09/223,964, filed Dec. 31, 1998, now U.S. Pat. No. 6,001,304 entitled "Method of Bonding a Particle Material To Near Theoretical Density", incorporated herein in its entirety by reference.

FIELD AND HISTORICAL BACKGROUND OF THE INVENTION

The present invention is directed to bonding particle materials, and more particularly to an apparatus for reactive or nonreactive synthesis, consolidation, or joining of metallic, ceramic, intermetallic, or composite materials to near-net shapes by application of high shear, high current (1–20 kA), and high pressure (about 1 to 2,000 MPa).

Pressure-assisted consolidation or sintering generally involves heating a particle powder compact, while applying pressure simultaneously. The powder compacts are typically heated externally using graphite or molybdenum heating elements and the pressure is applied hydraulically, pneumatically or isostatically using various types of gases depending on the type of the process. Conventional pressure assisted consolidation techniques include hot pressing, hot isostatic pressing, hot forging, and hot extrusion. The conventional techniques require long processing time and high chamber temperature in order to produce high-density parts. In addition, several preparatory steps are required, such as powder heat treatment, precompaction, canning, welding, and machining.

The field of powder consolidation includes powder particles with average particle sizes ranging from about 100 microns to less than 0.01 microns. In any powder consolidation process, the objective is to have minimum grain boundary contamination, maximum density and minimum grain growth. However, powder particles with large surface area, due to their surface charge distribution, readily react with the atmosphere and form a stable oxide phase, which significantly affects the consolidation process. The presence of these oxides, moisture and other contaminants on the surface of the particles, limits the final density that can be achieved and degrades the mechanical properties of the consolidated parts. Thus, it is important to reduce the surface impurities, such as oxygen and other contaminants present on the particle surfaces.

The consolidation of powders to near theoretical density, without significant grain growth has been a difficult task because of the tendency for the grains to coarsen at elevated temperature. Attempts have been made to consolidate powders with average particle size less than 0.01 microns by many techniques, such as furnace sintering, hot pressing, and hot isostatic pressing. However, the drawback is that the total time required for consolidation at the elevated temperature, is very long (several hours) which leads to significant grain growth, and poor mechanical and thermal properties.

Most refractory metals, ceramics, intermetallics and certain composite materials, are extremely hard and require diamond-tipped tools to machine them to final dimensions. In order to minimize expensive machining, the powder densification process must be capable of near-net shaping. The development of a novel equipment that consolidates the difficult-to-sinter materials into near-net shaped parts has been the goal of many powder metallurgy industries.

As application opportunities continue to emerge that require materials to perform at higher temperatures for sustained periods of time, joining of ceramic and intermetallic materials becomes necessary to enable advanced structure to be produced. Sinter bonding, sinter-HIP bonding, diffusion bonding are typically employed to join these advanced materials. However, long preparation and processing times are required in the conventional techniques that result in high manufacturing cost.

Metallic, ceramic, intermetallic, and composite materials have great potential in structural, electronic, thermal management and optical applications since these materials exhibit superior performance characteristics. Unfortunately, wide use of these materials is limited due to high cost of fabrication.

In summary, both the conventional (hot pressing, hot-isostatic pressing, sintering) and non-conventional powder densifying equipment (ROC-Rapid Unidirectional Compaction, Electroconsolidation, Quick-Hot Isostatic Pressing) are not designed for consolidating powders rapidly to full or near-theoretical density with minimum grain growth.

Various techniques and apparatus for compacting or sintering of powder materials are disclosed in U.S. Pat. Nos. 3,250,892; 3,340,052; 3,598,566; 3,670,137; 4,005,956; 5,084,088; 5,427,660; 5,529,746; and 5,794,113; and in publications—F. V. Lenel, "Resistance Sintering Under Pressure", Journal of Metal, Vol. 7, No. 1, pp 158–167 (1955), and M. J. Tracey et al., "Consolidation of Nanocrystalline Nb—Al Powders by Plasma Activated Sintering", NanoStructured Materials, Vol. 2, pp. 441–449 (1993).

The prior art apparatus are also not considered effective at least for the reasons that they: are limited to producing smaller size parts, result in nonuniform distribution of temperature throughout the powder compact, result in lower than near theoretical densities, result in undesirable grain growth, do not reactively consolidate or join the materials, do not consolidate or join precursor particle materials, require pretreatment or presynthesis of the particle material, do not apply to ultrafine particles (<1 micron), etc.

In view of the above, there is a need in the industry for an apparatus that can rapidly consolidate, bond or join precursor or elemental particle material to near theoretical density without requiring complicated preparatory steps.

OBJECTS AND SUMMARY OF THE INVENTION

The principal object of the present invention is to provide an apparatus for rapidly bonding a particle material to near theoretical density with minimum grain growth and to join or bond with high interface integrity and minimum microstructural distortion in the bulk material.

An object of the present invention is to provide an apparatus of bonding a particle material to near theoretical density and near net shape using pulsed plasma, pressure and current.

Another object of the present invention is to provide an apparatus in which a particle material can be reactively or nonreactively consolidated or joined to near-net shape and near theoretical density in a short period of time (less than 10 minutes) with minimum grain growth.

Yet another object of the present invention is to provide an apparatus for bonding a particle material to near theoretical density in which oxygen and other contaminants are removed during the bonding step without any additional preparatory steps.

Still yet another object of the present invention is to provide an apparatus for bonding particle material to near theoretical density which produces bonded material or desired articles economically at reduced processing temperature and time while maintaining nanometer dimensions.

An additional object of the present invention is to provide an apparatus for bonding a particle material to near theoretical density which produces dense near-net shape parts or articles without expensive machining.

Yet an additional object of the present invention is to provide a rapid bonding apparatus that can join ceramic, intermetallic, and other dissimilar materials in a short period of time without any complicated preparation.

Still yet an additional object of the present invention is to provide an apparatus for bonding a particle material to near theoretical density which can produce near-net shape parts or articles directly from precursors or elemental particle material without the complicated synthesis steps.

Another object of the present invention is to provide an apparatus for bonding a particle material to near theoretical density by simultaneously applying high shear or high pressure, and high current directly to the particle material resulting in: high heating rate (20° C.–3,000° C. per minute), improved particle surface activation, enhanced densification, uniform distribution of heat, and strong bonding.

Yet another object of the present invention is to provide an apparatus for bonding a particle material to near theoretical density which can be used to bond powders with average particle size ranging from 100 microns to 0.01 microns, without significant grain growth, by rapidly processing at lower temperature and duration.

Still yet another object of the present invention is to provide an apparatus for bonding a particle material to near theoretical density which does not require the use of any binders or additives for producing desired shapes.

An additional object of the present invention is to provide an apparatus for bonding a particle material to near theoretical density which produces near-net shape, high density ceramic or other material parts by using a combination of "sol-gel" precursor and a reactive gas in the presence of pulsed and steady electric field.

Yet an additional object of the present invention is to provide an apparatus for bonding a particle material, such as $B_4C/SiC$, $Ti\ B_2/BN$, and $Al_2O_3/AlN$.

An additional object of the present invention is to provide a method of rapidly bonding diamond and coated diamond powders into near-net shaped parts or articles.

Yet an additional object of the present invention is to provide an apparatus for bonding a particle material to near theoretical density which can produce near-net shape parts of any desired geometry, such as cylindrical, cubic, rectangular, hemispherical, tubular, or any combination thereof.

Still yet additional object of the present invention is to provide an apparatus for bonding a particle material to near theoretical density by creating interparticle plasma which controls the undesirable grain growth, reduces the densification temperatures, and significantly improves the properties of the bonded material.

A further object of the present invention is to provide an apparatus for producing an article having a near-net shape and near theoretical density and a length of less than one-half inch to six inches or more, or a diameter of less than one-half inch to six inches or more.

Yet a further object of the present invention is to provide an apparatus for producing near-net shaped articles having improved properties, rapidly and at significantly lower manufacturing costs.

Still yet a further object of the present invention is to provide an apparatus for bonding a particle material by producing interparticle plasma that controls particle grain growth, reduces densification temperatures and improves the overall properties of the bonded material.

An additional object of the present invention is to provide an apparatus for bonding a particle material which can be used to restore or repair damaged parts or articles.

Yet an additional object of the present invention is to provide an apparatus for bonding a particle material which can be used to coat or clad a particle material to a surface.

Still yet an additional object of the present invention is to provide an apparatus for bonding a particle material which can be used to grow single crystals of a particle material.

In summary, the invention relates to an apparatus for reactive and non-reactive synthesis, consolidation, sintering, joining, or bonding of particle material into near-net shape and near theoretical density using high shear, high pressure (less than 1–2,000 MPa) and high current (1–20 kA).

In the technique used in the apparatus of the invention, the materials to be consolidated or joined, are placed preferably in a graphite die and punch assembly. The driving force for densification and joining is provided by passing current directly through the particle material, while simultaneously applying high shear and high pressure in separate steps. High shear force in combination with pulsed electric power is initially applied to the particle material to generate electrical discharge that activates the particle surface by evaporation of oxide film, impurities, and moisture. Subsequently, bonding is accomplished by resistance heating at the contact points between the activated particles in the presence of high pressure. The time and temperature required for consolidation or joining is lowered as high current density is applied in addition to high shear and high pressure (up to 2,000 MPa), which leads to localized heating and plastic deformation at interparticle contact areas. The rapid sintering, which preferably lasts for less than ten minutes, prevents grain growth and allows the particles to retain their initial microstructure.

The unique feature of the technique used in the apparatus of the invention, is the simultaneous application of pulsed current and high shear on the particle material resulting in surface heating of the particles to very high temperatures for short periods of time resulting in a localized plasma which enhances the rupturing of the surface oxide layers and facilitates rapid diffusion at the surface of the particles. The temperature of the particle material remains low, thereby minimizing the grain growth and the processing temperature. Application of the shear forces during surface heating of the particles results in an abrasive action between the particles to further facilitate rupturing of the surface oxide layer and redistribution of the particles. High shear causes deformation of the powder particles, de-agglomeration of the particles and since they are in intimate contact it reduces the consolidation temperature. Reduced consolidation temperature results in reduced grain growth and improved performance.

The apparatus of the present invention includes a chamber, a device for supporting a particle material to be bonded, a device for applying a shear force to the particle material, and a source for applying a current to the particle material.

It is noted herewith that, as used herein, the term "bonding" includes, but is not limited to, reactive or nonreactive joining of generally solid materials, and reactive or nonreactive consolidation, sintering or synthesis of particles or powder materials. Likewise, the term "particle material", includes, but is not limited to, particle material in any form, such as solid, liquid, powder, gas, fluid, etc. Preferably, the particle material includes metallic, ceramic, intermetallic, alloy, composite, coated or uncoated powders, porous materials, partially dense, and fully dense substrates.

BRIEF DESCRIPTION OF THE DRAWINGS

The above and other objects, novel features and advantages of the present invention will become apparent from the accompanying detailed description of the invention as illustrated in the drawings, in which;

FIG. 4 is an enlarged sectional view taken along line 4—4 of FIG. 3;

FIG. 5 is a partial enlarged sectional view taken along line 5—5 of FIG. 3;

FIG. 6 is a partial enlarged sectional view taken along line 6—6 of FIG. 3;

FIG. 7 is an enlarged front elevational view of the compaction chamber of the apparatus of the present invention;

FIG. 8 is a side view of the compaction chamber shown in FIG. 7;

FIG. 12 is a partial enlarged sectional view of the compaction assembly showing an alternative embodiment.

DETAILED DESCRIPTION OF THE INVENTION

Figure 1:
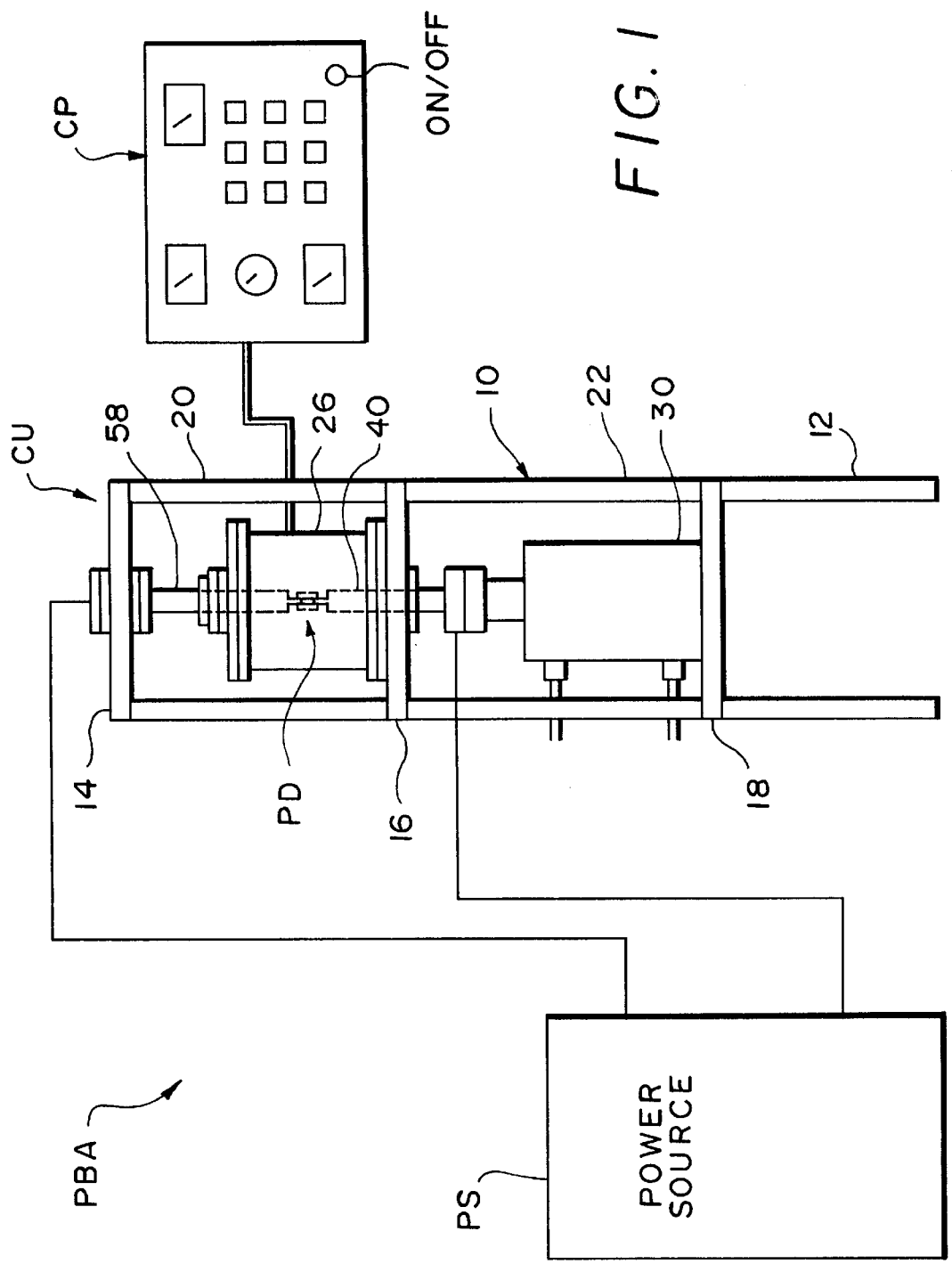
FIG. 1 is a schematic illustration of the apparatus of the present invention.

As best shown in FIG. 1, the particle bonding apparatus PBA of the present invention includes a power source PS, a compaction unit CU, and a control panel CP, that are operably connected to each other in a conventional manner.

Figure 2:
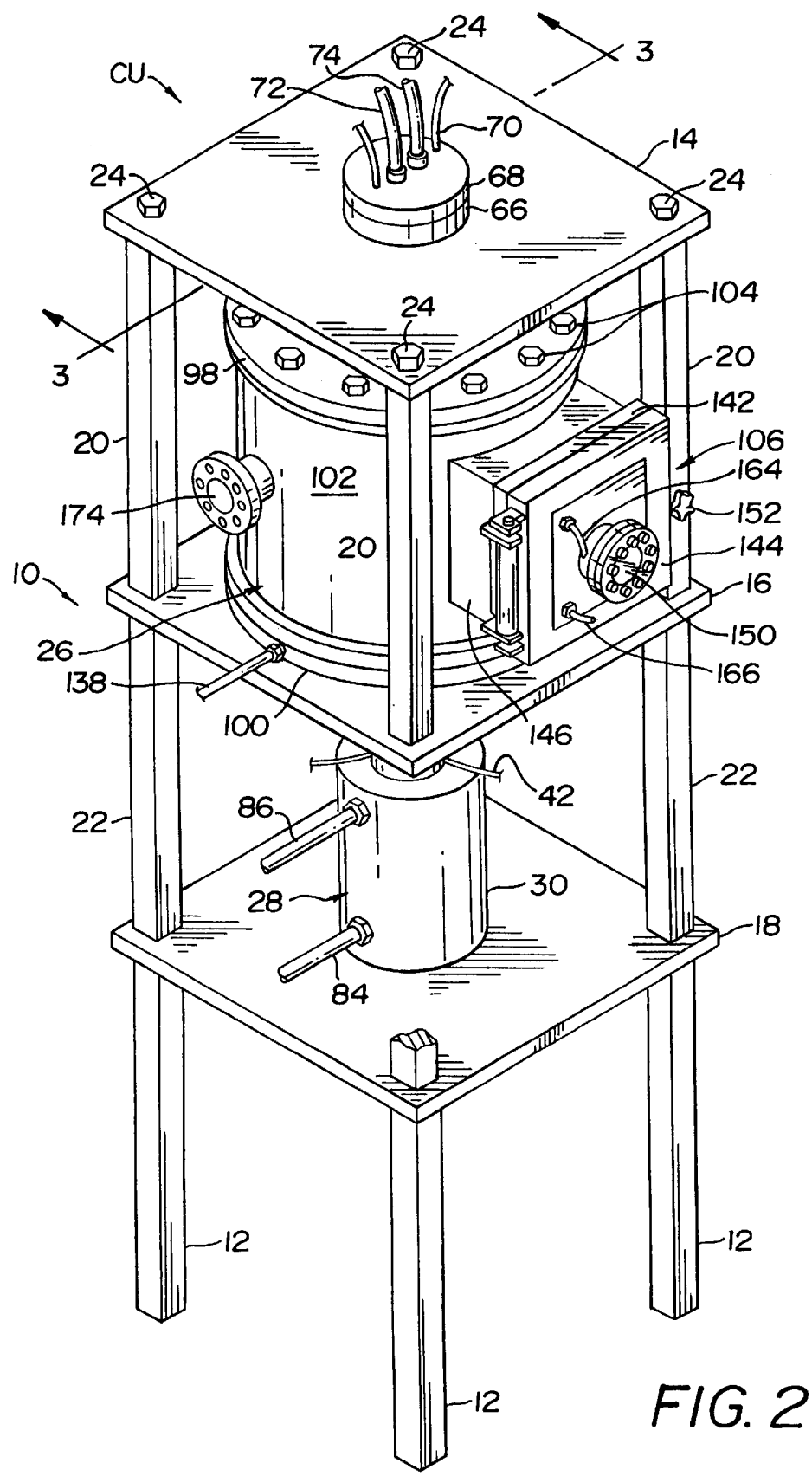
FIG. 2 is a perspective view of the compaction assembly of the apparatus of the present invention.
Figure 3:
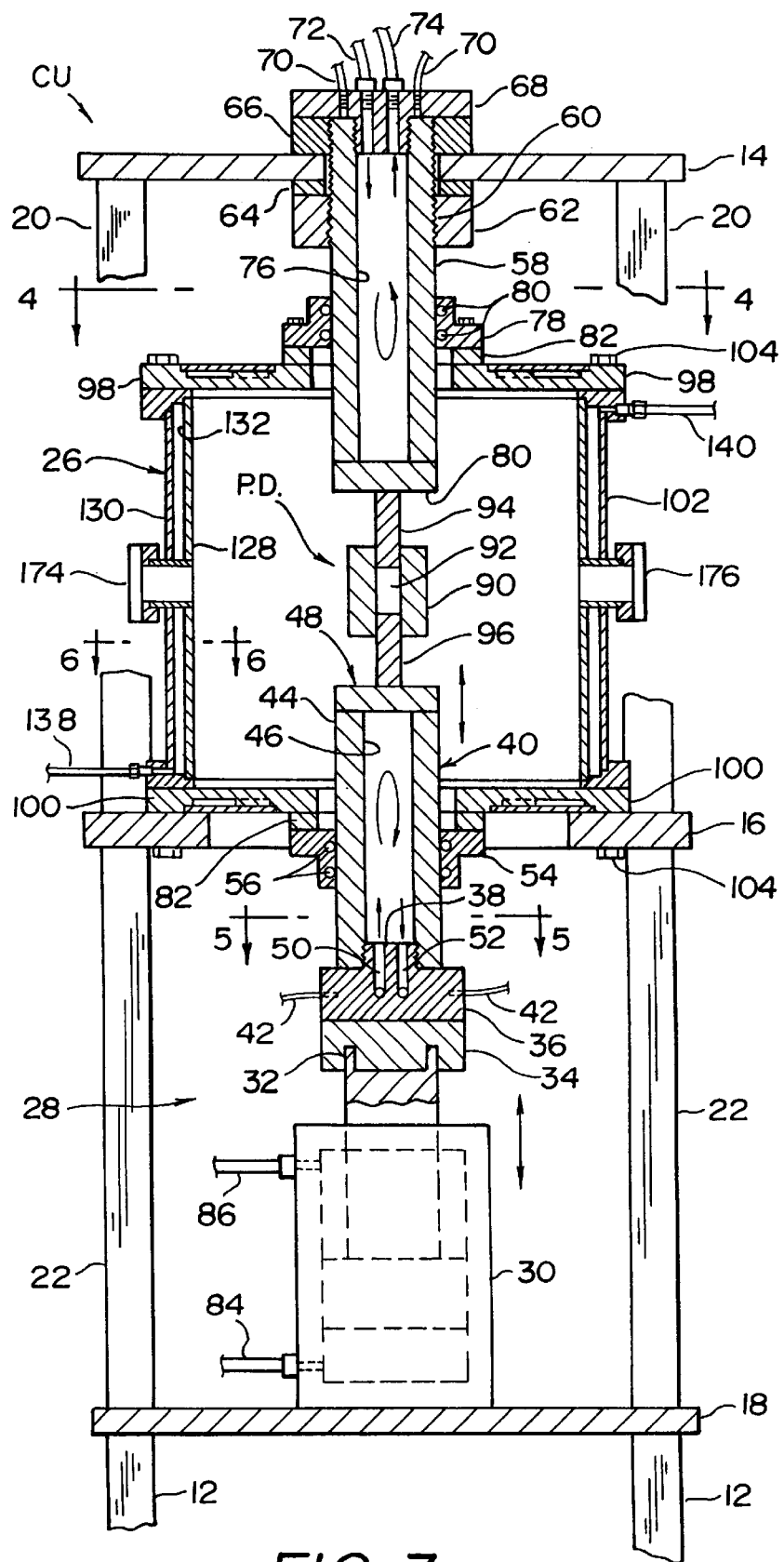
FIG. 3 is a sectional view taken along line 3—3 of FIG. 2.

The principal component of the bonding apparatus PBA, is the compaction unit CU, as best illustrated in FIGS. 2–3. The compaction unit CU is in the form of a self-standing frame 10 having legs 12 for supporting on a support surface. The frame 10 includes an upper support plate 14, a middle support plate 16 and a lower support plate 18. The upper support plate 14 is fastened to and supported on the middle plate 16 by legs 20. Likewise, the middle support plate 16 is fastened to and supported on the lower support plate 18 by legs 22. The frame 10 thus described is constructed and configured in a conventional manner and includes, for example, screw-fasteners 24 for mounting the upper support plate 14 to the legs 20. The frame 10 is preferably made from a strong, durable heat-resistant material, such as steel.

As best illustrated in FIGS. 2–3, a compaction chamber 26 is supported on the middle support plate 16, and a pressure application system 28 is supported on the lower support plate 18. The pressure application system 28 preferably includes a hydraulic or pneumatic cylinder 30, the top 32 of which is press-fitted into an insulator plate 34. The insulator 34 is, in turn, mounted to a power source connector 36. The connector 36 includes an externally-threaded projection 38 for engaging the internal threads of the lower plunger 40. The connector 36 is connected to the power source PS by conventional cables 42. The insulator plate 34 is preferably made of a high-strength polymer based material and functions to insulate the pressure system 28 from the power supply fed to the plunger 40.

The cylinder 30 may be a conventional double acting hydraulic or pneumatic cylinder, with the associated mechanisms for actuation, variation, regulation and detecting of the pressure, controlled by an operator from the control panel CP.

Figure 9:
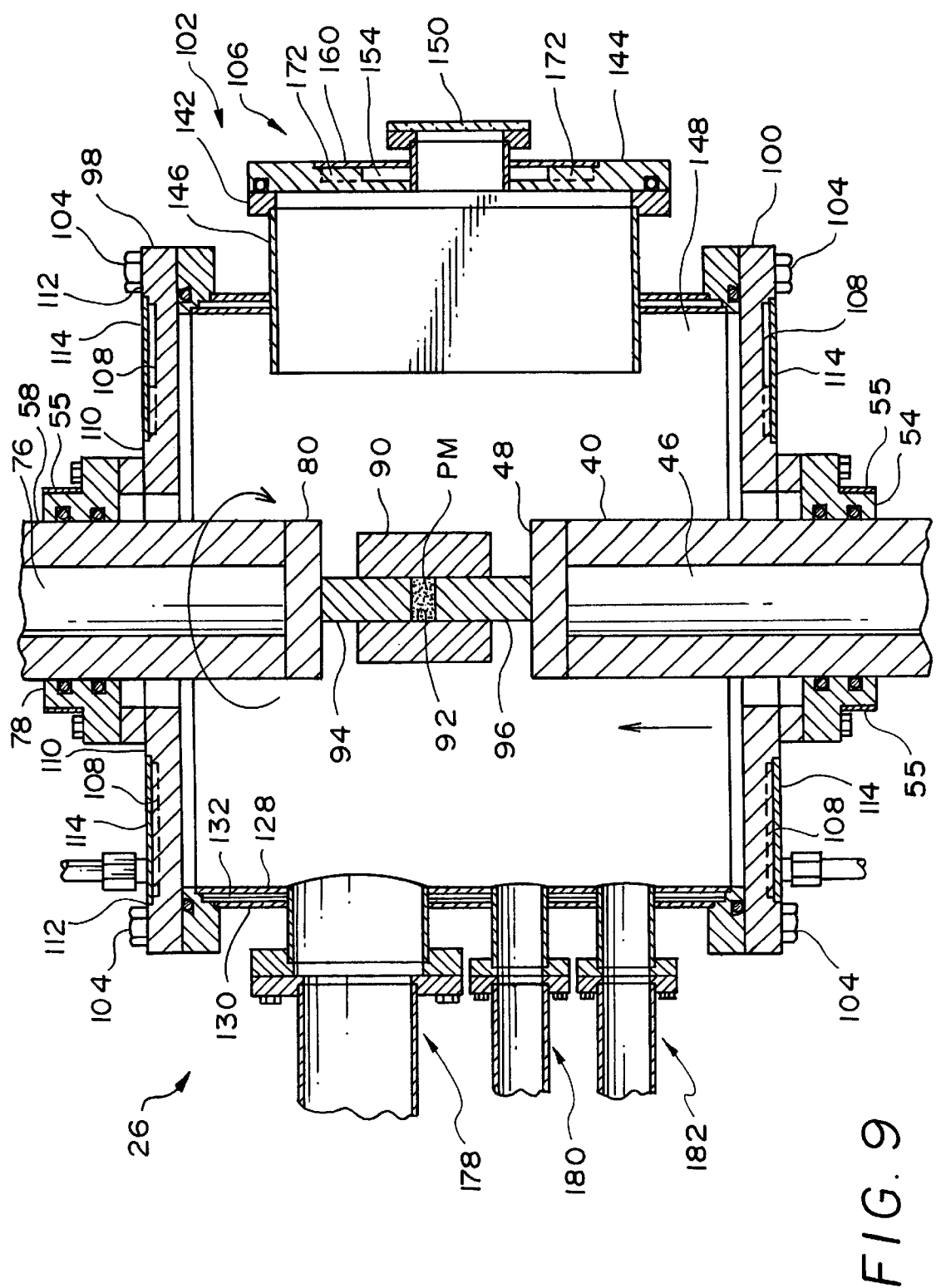
FIG. 9 is an enlarged sectional view taken along line 9—9 of FIG. 7.

The lower plunger 40 is in the form of a generally cylindrical member 44 defining a recess 46 therein. A heat-resistant head plate 48 is mounted to the cylinder 44. Inlet and outlet lines 50 and 52 are connected to a source for supplying a cooling fluid, such as water to the recess 46 through the corresponding passageways in the connector 36, to dissipate the heat from the plunger 40. The fluid supplied to the plunger 40, circulates through the recess 46, thereby keeping it cool and from heating-up. As further shown in FIG. 3, a high-strength, preferably steel-reinforced polymer collar 54 is provided between the plunger 40 and the middle support plate 16. In order to maintain a fluid-tight connection between the chamber 26 and the exterior, two O-rings 56 are provided in the collar 54. Also, a steel plate 55 may be provided around collars 54 (and 78) to prevent its deformation (FIG. 9). Although not shown, a port may be provided in the collar 54 for differential pumping to minimize leakage between the inside of the chamber 26 and the exterior, or to maintain a pressure, preferably of $10^{-1}$ to $10^{-7}$ torr inside the chamber 26.

An upper plunger 58, having the same structural features as the lower plunger 40, with the exception of additionally having external threads 60, extends downwardly into the compaction chamber 26. The upper plunger 58 is mounted to the upper support plate by a lock-nut 62, and is insulated therefrom by high-strength polymer-based insulating plates 64 and 66. The plates 64 and 66 have internal threads that engage with the external threads 60 of the plunger 58, to thereby fixedly mounting to the plate 14 in a known manner.

A power source connector 68, similar in structure to the connector 36, is mounted atop the plunger 58. The connector 68 is connected to the power source PS by conventional cables 70. Inlet and outlet lines 72 and 74 extend through the corresponding passageways in the connector 68 (as in connector 36), to circulate a cooling fluid through the recess 76 of upper plunger 58. A collar 78 (similar to collar 54), with two O-rings 80 is provided to maintain a fluid-tight connection between the upper plunger 58 and the inside of the compaction chamber 26. Like the lower plunger 40, the upper plunger 58 also includes a heat-resistant head plate 80, preferably made of steel. One of ordinary skill in the art would appreciate that the heat from the head-plates 48 and 80 would be dissipated by the fluid circulating through the corresponding recesses 46 and 76. The upper and lower plungers 58 and 40 are preferably made of steel and are electropolished in order to minimize the leakage and to reduce the friction between the corresponding collars 54 and 78.

In FIG. 3, reference numerals 82 represent mounting plates for properly securing the collars 54 and 78 to the chamber 26. Further, reference numerals 84 and 86 represent hydraulic or pneumatic lines for connecting to a pressure source (not shown).

As shown in FIG. 3, the upper plunger 58 remains stationary while the lower plunger 40 reciprocates axially. These functions may be easily reversed by interchanging the associated components. In either situation, axial pressures are applied by the upper and lower plungers 58 and 40.

Preferably, the upper and lower plungers 58 and 40 apply a shear force of about 5–50 MPa and an axial pressure of about 1–2,000 MPa. The upper plunger 58 is preferably connected to a variable speed D.C. drive motor to impart a rotational motion thereto (FIG. 12), and the lower plunger 40 is given a reciprocating motion by the hydraulic or pneumatic pressure application system 28. (It is noted herewith that it is well within the scope of this invention to apply the shear force by using a hydraulic mechanism, a pneumatic mechanism, hydropressure mechanism, an electric field, a magnetic field, or a combination thereof.) The rotary motion provides the desired shear force while the reciprocating motion provides the desired axial pressure. Both of these motions can be applied separately or simultaneously. The motions of the upper and lower plungers 58 and 40, may also be interchanged, i.e., the upper plunger 58 can be made to reciprocate, while the lower plunger 40 can be made to rotate, simply by interchanging the associated drive mechanisms.

In order to contain the powder and/or other material during the bonding process, a punch-die assembly PD is used (FIG. 3). The punch-die assembly PD preferably includes a generally cylindrical die 90 having a recess 92 extending therethrough. Upper and lower punches 94 and 96 extend from the opposite ends of the recess 92 into the die 90. Preferably, a graphite or carbon-carbon composite punch-die assembly is used. The shape and size of the punch-die assembly PD depends on the dimensions of the final article being made, repaired or being worked on.

As best shown in FIGS. 2–3 and 7–9, the compaction chamber 26 includes top and bottom plates 98 and 100, and a body portion 102 therebetween. The plates 98 and 100 and the body portion 102, are mechanically fastened together and to the middle support plate 16 by conventional bolts 04. The chamber 26 is preferably made of steel and includes a door assembly 106. The top and bottom plates 98 and 100 have the same structure and therefore, only one of them is described hereinafter.

As best shown in FIGS. 4 and 9, the top plate 98 includes a heat-dissipating section in the form of a generally circular recess or cavity 108 defined between an inner portion 110 and an outer portion 112, and enclosed by a cover plate 114. As best shown in FIG. 4, although the recess preferably extends about the entire perimeter of the plate 98, it is interrupted by a partition wall 116. Accordingly, a cooling fluid supplied to the recess 108 through a fluid inlet 118, circulates about the perimeter of the recess and then exits through the fluid outlet 120 (see arrows 122 in FIG. 4). In order to impart turbulent energy to the fluid, inner and outer baffles 124 and 126, are provided which extend from the inner and outer portions 110 and 112, respectively. Preferably, the inner baffles 124 (and the outer baffles 126) are equilaterally disposed from each other. Further, the inner baffles 124 are orientated in an offset relationship to the outer baffles 126. In this regard, it is noted herewith that although three inner baffles 124 and four outer baffles 126 are shown herein, it is well within the scope of this invention to vary the number and dimensions thereof, and to vary the manner of positioning in the plate 98 for a desired turbulent effect of the circulating fluid.

As best shown in FIGS. 6 and 9, the body portion 102 of the compaction chamber 26 is preferably doubled-walled, and includes inner and outer walls 128 and 130, respectively, defining a recess 132 therebetween. As best shown in FIG. 6, inner and outer baffles 134 and 136 extend into the recess 132, and are disposed in an offset relationship to each other. The inner and outer baffles 134 and 136 are preferably provided throughout the perimeter of the body portion 102 and are equilaterally spaced from each other. A cooling fluid enters the recess 132 through an inlet 138 and exits therefrom through outlet 140 after circulating therethrough (FIGS. 3–4).

As best shown in FIGS. 2, 7–8 and 9, the door assembly 106 includes a door mount 142 and a door 144 pivotally connected thereto in a conventional manner. A conduit 146 extends between the door 144 and the inside 148 of the chamber 26. A see-through window 150 is provided in the door 144, and a conventional knob 152 is mounted to the door assembly 106 for locking and unlocking the door 144.

As best shown in FIGS. 7 and 9, the door 144 is also fluid-cooled and includes a recess or cavity 154 defined by inner and outer portions 156 and 158, respectively, and enclosed by a cover plate 160. The recess 154 preferably extends about the entire perimeter of the door, but is interrupted by a partition wall 162 (FIG. 7). Accordingly, the cooling fluid supplied to the recess 154 through inlet 164, circulates through the recess 154 and exits through the fluid outlet 166 (see arrows 168 in FIG. 7). As in the top and bottom plates 98 and 100, an inner baffle 170 and outer baffles 172 extend into the recess 154 from the inner and outer portions 156 and 158, respectively. The inner and outer baffles 170 and 172 are disposed in an offset relationship to each other. It is noted herewith that the number, dimensions, and location of the inner and outer baffles, may be varied to achieve a desired deflecting effect for the fluid flowing through the recess 154.

In FIGS. 3 and 7, reference numerals 174 and 176 represent ports for connecting a probe or the like device for measuring the vacuum inside the chamber 26 and for connecting an infrared detector for monitoring the temperature therein, respectively. Likewise, in FIG. 8, reference numeral 178 represents a port for connecting a source for applying vacuum to the compaction chamber 26. Further, reference numerals 180 and 182 represent ports for gas inlet and outlet, respectively, if a gaseous atmosphere is desired during compaction or bonding. Although not shown various other ports, such as for connecting a valve for venting, connecting a thermocouple, may be provided. It is noted herewith, that the number of ports may be increased or decreased depending on the process requirements. For example, additional ports may be added, if necessary, in order to monitor the exhaust gases or to inject a fine spray of water in case of die failure inside the chamber 26. In this regard, different types of vacuum pumps may be connected to the compaction chamber 26 in order to obtain a desired pressure therein. For example, a rotary mechanical pump may be used to obtain pressures of $10^{-2}$ to $10^{-3}$ torr. Likewise, diffusion and turbo pumps may be used to obtain pressures of $10^{-3}$ to $10^{-7}$ torr.

Figure 10:
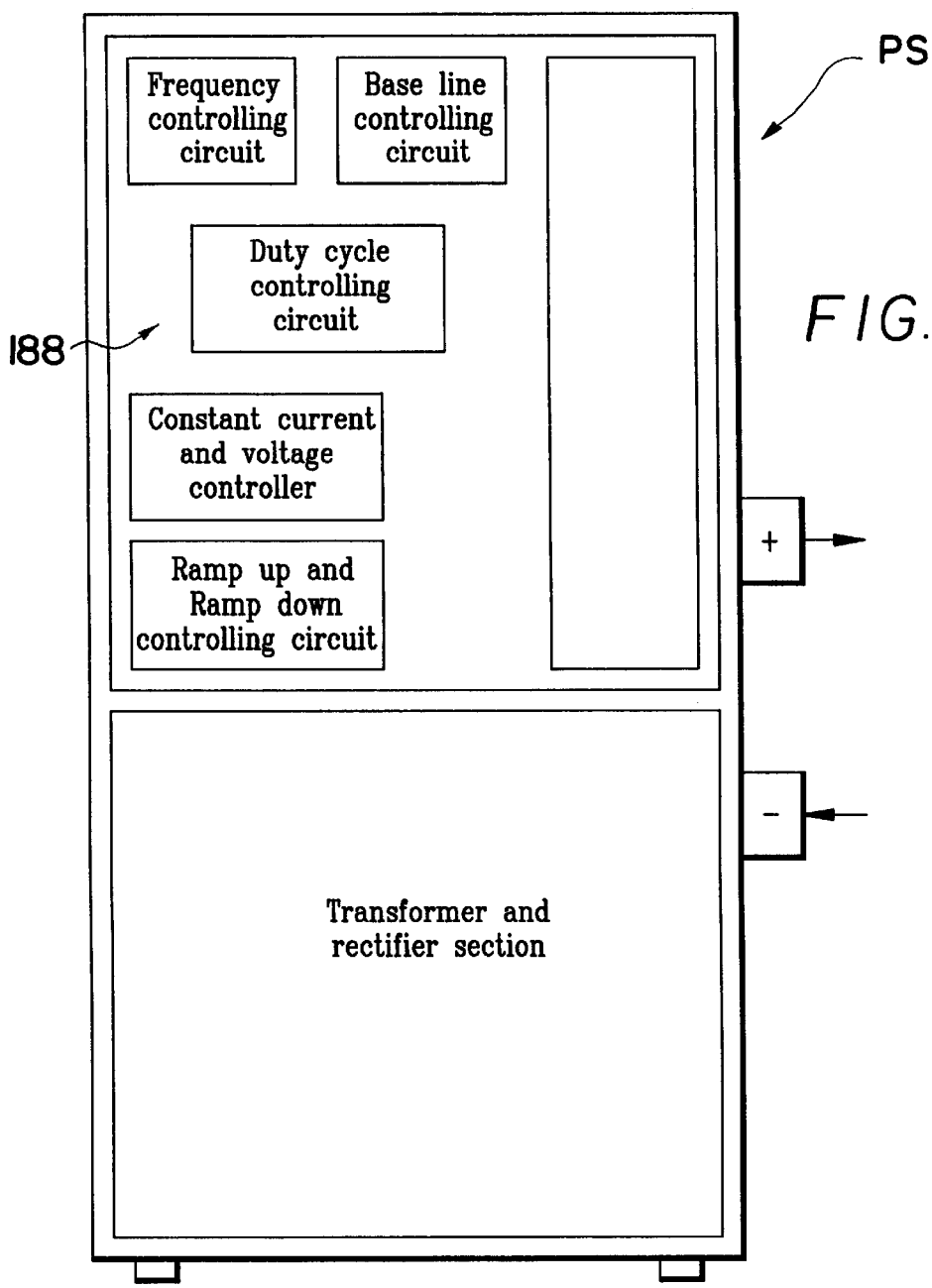
FIG. 10 is a schematic illustration of the power source shown in FIG. 1.
Figure 11:
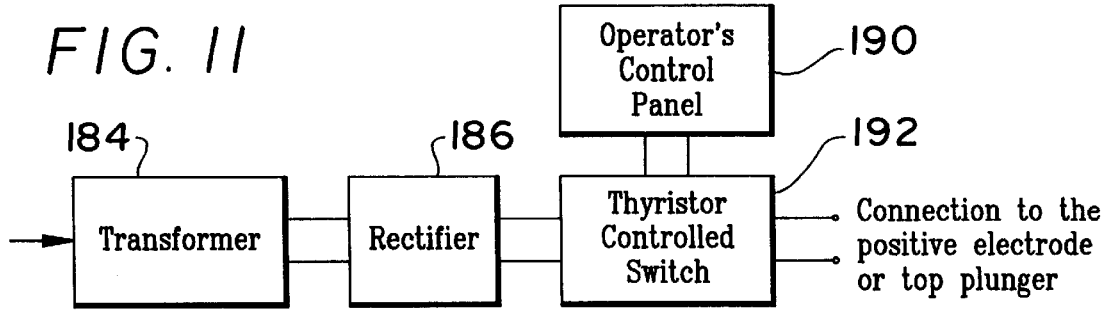
FIG. 11 illustrates the control circuit used in the apparatus of the present invention.

As best shown in FIGS. 10–11, the power source PS includes a transformer 184, a rectifier 186, a pulsing system control circuit 188, and the control panel CP. A thyristor controlled switch 190 is provided between the control panel CP and the rectifier 186.

The transformer 184 steps down the voltage with simultaneous stepping up of the current. The rectifier 186 converts the alternating current into direct current. This DC current is then connected to a thyristor controlled switch 192 which then supplies the necessary power to the plungers 40 and 58. The operation of the thyristor controlled switch 192 is controlled by the pulsing control circuit 188.

The pulsing control circuit 188 includes a series of electronic devices, which provide the flexibility for controlling the pulsing rate (pulsing frequency), pulsing time period (duty cycle), base line control, steady DC current control and the DC voltage control.

The control panel 190 includes of a series of switches which can be controlled manually or through a computer. The control panel provides the following switches—power ON, power OFF, pulsing ON, pulsing OFF, meter for reading the voltage, meter for reading the current, switch for controlling the voltage, current, pulsing rate, base line, peak current, duty cycle, ramp up time, ramp down time and forward/reverse switch. The forward/reverse switch changes the polarity of the plungers 40 and 58. This is extremely important for densifying parts with a part length of greater than one inch. Changing polarity also ensures uniform distribution of the temperature within the powder material to be bonded or densified.

As noted above, one of the upper and lower plungers 58 and 40 may be rotated to impart a shear force to the particle material PM. FIG. 12 illustrates a belt-pulley system BP for rotating preferably the upper plunger 58. As shown in FIG. 12, a cap 194 includes upper and lower projections 196 and 198, and a body portion 200 therebetween. Two passageways 202 and 204 extend through the cap 194 for receiving and discharging a cooling fluid via inlet and outlet 206 and 208, respectively. A pulley 210, fixedly mounted to the upper projection 196, is in rotational engagement with a variable speed D.C. motor 212, via a belt 214. The body portion 200 is provided with bearings 216 that engage with an insulating plate 218.

The lower projection 198 includes external threads 220 for engaging with the internal threads 61 of the upper plunger 58. A lock-nut 222, including bearings 224, is mounted below the upper support plate 14. The lock-nut 222 includes internal threads 226 that engage with the external threads 60 of the upper plunger 58. Although not shown, a conventional mechanism may be used to ground the upper electrode 58.

USE AND OPERATION

The apparatus PBA of the present invention may be used to carry out various techniques described herein and in the co-pending U.S. application Ser. No. 09/223,964, filed Dec. 31, 1998, incorporated herein in its entirety by reference. In summary, the apparatus of the present invention may be used to bond a particle material to near theoretical density, repair or coat a substrate, and to grow single crystals of a particle material.

In a typical application, a particle material PM to be bonded, is placed in the die 90 and the punches 94 and 96 are inserted in the die recess 92. A shear force of about 5–50 MPa is then applied to the particle material for a predetermined time period by rotating one or both of the upper and lower plungers 58 and 40, at a speed of about 1–10 revolutions/min. Substantially simultaneously to applying the shear force, a current is applied to the particle material PM for a predetermined time period. An axial pressure of about 1–2,000 MPa is then applied to the particle material PM by reciprocating one or both of the lower and upper plungers 58 and 40. Finally, and substantially simultaneously with the application of the axial pressure, a current of about 1–20,000 amps is applied to the particle material PM for thereby bonding the particle material.

The following Table 1 summarizes various parameters for use in the apparatus of the present invention.

TABLE 1

| Parameter | Operating Range | Preferred Range |
| --- | --- | --- |
| Temperature | Room temperature to 3000° C. (25° C.) | Room temperature to 2500° C. (25° C.) |
| Pressure | <1 MPa to 2000 MPa | 10 to 200 MPa |
| Cycle Time | <1 minute to 600 minutes | 5 to 30 minutes |
| Pulsing Frequency | 1 to 1000 Hz | 10–100 Hz |
| Peak Current | 5 A to 20 kA | 200 A to 20 kA |
| Base Line | 0 to 14000 A | 0–4000 A |
| Current | 1 to 20 kA | 1 to 8 kA |
| Heating Rate | 1–1500° C./minute | 100–1500° C./minute |
| Voltage | 1–100 V | 1–30 V |

The following Examples are provided to illustrate the use of the apparatus of the present invention, but it is understood that the invention is not limited thereto

EXAMPLE 1

The power supply was connected to a 208–220V/3 phase AC power supply with a maximum current of 200 amps. The power supply converted the input power into 0–10V/0–3000 amps (maximum) DC power. This current was fed to the plungers both in the forward and the reverse mode. Temperatures in the range of 20 to 1500° C. were recorded using graphite punches and dies during densification of metallic powders. Fully dense parts were obtained with minimum grain growth. Temperature attained was a function of part size and maximum current applied.

EXAMPLE 2

The power supply was connected to a 432–458V/3 phase AC power supply with a maximum current of 300 amps. The power supply converted the input power into 0–10V/0–10000 amps DC power. This current was fed to the plungers both in the forward and the reverse mode. Plasma temperatures from 20 to 2500° C. were observed. Pulsing rate was varied from 10 Hz to 100 Hz. Base line was varied from 100 A to 8000 A and duty cycle was varied from 0–90%. Series of powder densification experiments were performed on metallic, ceramic, intermetallic and composite powders. Fully dense parts were obtained with minimum grain growth.

EXAMPLE 3

The power was connected to a 440V/3 phase AC power supply with a maximum current of 300 amps. The power supply converted the input power into 0–10V/0–10000 amps DC power. This current was fed to the plungers both in the forward and the reverse mode. Plasma temperatures of up to 2500° C. were observed. One of the plungers was rotated at 2 to 25 revolutions per minute to apply shear force. Series of powder densification experiments were performed on metallic, ceramic, intermetallic and composite powders. Fully dense parts were obtained with minimum grain growth.

EXAMPLE 4

The power supply was connected to a 208–220V/3 phase AC power supply with a maximum current of 300 amps. The rectifier converted the input power into 0–10V/0–4000 amps DC power. This current was fed to the plungers both in the forward and the reverse mode. Plasma temperatures of up to 20 to 2500° C. were observed. Hydraulic cylinder was replaced with pneumatic cylinder, which was connected to a compressed air source. Pressures of up to 70 MPa were applied using this system on graphite and carbon-carbon plungers and dies.

EXAMPLE 5

The power supply was connected to a 208–220V/3 phase AC power supply with a maximum current of 200 amps. The rectifier converted the input power into 0–10V/0–3000 amps DC power. This current was fed to the plungers both in the forward and the reverse mode. Plasma temperatures of up to 20 to 2000° C. were observed. Hydraulic cylinder was replaced with hydropressure cylinder, which was connected to a booster pump and a water tank. The movement of the plunger was controlled by diverting the water flow to the required port using a four way solenoid valve. Pressures of up to 50 MPa was applied using this system. Metallic and ceramic powders were densified to fully density at various temperatures and pressures.

EXAMPLE 6

The power supply was connected to a 220V/3 phase AC power supply with a maximum current of 200 amps. The power supply converted the input power into 10V/3000 amps DC power. This current was fed to the plungers both in the forward and the reverse mode. Plasma temperatures of up to 2000° C. were observed. Vacuum chamber pressure was reduced to $10^{-3}$ torr. This resulted in parts with low oxygen content and improved mechanical properties.

While this invention has been described as having preferred ranges, steps, materials, or designs, it is understood that it is capable of further modifications, uses and/or adaptations of the invention following in general the principle of the invention and including such departures from the present disclosure as those come within the known or customary practice in the art to which the invention pertains and as may be applied to the central features hereinbefore set forth, and fall within the scope of the invention and of the limits of the appended claims.

What is claimed is:

1. An apparatus for bonding a particle material to near theoretical density, comprising:
   a) means for supporting a particle material to be bonded;
   b) means operably associated with said particle material supporting means for applying a shear force to the particle material; and
   c) means operably associated with said particle material supporting means for applying a current to the particle material.
2. The apparatus of claim 1, further comprising:
   a) means for applying an axial pressure to the particle material.
3. The apparatus of claim 1, wherein:
   a) said particle material supporting means comprises a generally cylindrical die defining a recess therein.
4. The apparatus of claim 3, wherein:
   a) said particle material supporting means comprises a punch member for operably associated with said die.
5. The apparatus of claim 4, wherein:
   a) said shear force applying means comprises a plunger for operably associated with said punch member.
6. The apparatus of claim 5, further comprising:
   a) means for dissipating thermal energy from said plunger.
7. The apparatus of claim 6, wherein:
   a) said plunger comprises a generally cylindrical member defining a recess therein; and
   b) said thermal energy dissipating means comprises a source for supplying a cooling fluid to said cylindrical member.
8. The apparatus of claim 3, wherein:
   a) said particle material supporting means comprises first and second punch members operably associated with said die.
9. The apparatus of claim 8, wherein:
   a) said shear force applying means comprises first and second plungers for operably associated with said first and second punch members, respectively.
10. The apparatus of claim 9, further comprising:
    a) means for dissipating thermal energy from said first and second plungers.
11. The apparatus of claim 10, wherein:
    a) each of said first and second plungers comprises a generally cylindrical member defining a recess therein; and
    b) said thermal energy dissipating means comprising a source for supplying a cooling fluid to said cylindrical members.
12. The apparatus of claim 9, further comprising:
    a) means for rotating one of said first and second plungers.
13. The apparatus of claim 12, further comprising:
    a) means for axially reciprocating the other of said first and second plungers.
14. The apparatus of claim 9, further comprising:
    a) means for rotating one of said first and second plungers in one direction and rotating the other of said first and second plungers in a second direction.
15. The apparatus of claim 1, wherein:
    a) said shear force applying means comprises hydraulic means, pneumatic means, hydropressure means, ultrasonic means, an electric field, a magnetic field, or a combination thereof.
16. The apparatus of claim 1, wherein:
    a) said shear force applying means comprises means for applying a shear force of about 5–50 MPa.
17. The apparatus of claim 1, wherein:
    a) said current applying means comprises means for applying a pulsed current, a steady current, or a combination thereof.
18. The apparatus of claim 17, wherein:
    a) said current applying means comprises means for applying a pulsed current, a steady current, or a combination thereof of about 1–20,000 amps.
19. The apparatus of claim 2, wherein:
    a) said axial pressure applying means comprises means for applying an axial pressure of about less than 1–2,000 MPa.

* * * * *